United States Patent
Wilson et al.

(10) Patent No.: US 6,701,148 B1
(45) Date of Patent: Mar. 2, 2004

(54) METHOD AND APPARATUS FOR SIMULTANEOUS RADIO AND MOBILE FREQUENCY TRANSITION VIA "HANDOFF TO SELF"

(75) Inventors: James E. Wilson, Richardson, TX (US); Daniel Carter, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/468,551

(22) Filed: Dec. 21, 1999

(51) Int. Cl.⁷ .................................................. H04Q 7/20
(52) U.S. Cl. ..................... 455/436; 455/437; 455/439; 455/442; 455/444; 370/331; 370/332
(58) Field of Search ................................ 455/436, 438, 455/450, 452, 437, 439, 442, 444, 422, 67.1; 370/331, 332

(56) References Cited

U.S. PATENT DOCUMENTS

| | | | | |
|---|---|---|---|---|
| 4,736,453 A | * | 4/1988 | Schloemer | 455/33 |
| 5,278,991 A | * | 1/1994 | Ramsdale et al. | 455/33.2 |
| 5,491,837 A | * | 2/1996 | Haartsen | 455/62 |
| 5,541,979 A | * | 7/1996 | Leslie et al. | 379/60 |
| 5,551,064 A | * | 8/1996 | Nobbe et al. | 455/62 |
| 5,812,935 A | * | 9/1998 | Kay | 455/56.1 |
| 5,878,349 A | * | 3/1999 | Dufour et al. | 455/438 |
| 5,974,319 A | * | 10/1999 | Kotzin et al. | 455/436 |
| 6,049,715 A | * | 4/2000 | Willhoff et al. | 455/436 |
| 6,112,086 A | * | 8/2000 | Wala | 455/434 |
| 6,192,038 B1 | * | 2/2001 | Wallerius et al. | 370/328 |
| 6,393,003 B1 | * | 5/2002 | Lee | 370/331 |
| 6,470,179 B1 | * | 10/2002 | Chow et al. | 455/406 |

* cited by examiner

*Primary Examiner*—Vivian Chin
*Assistant Examiner*—Marceau Milord
(74) *Attorney, Agent, or Firm*—Haynes and Boone, LLP

(57) ABSTRACT

A cellular network having an radio frequency (RF) management capability includes a mobile switching center, at least one base station controller operative coupled to the mobile switching center, and at least one base station operatively coupled to the at least one base station controller. The at least one base station is for being operatively coupled with at least one mobile station for carrying out at least one mobile communications call. Lastly, a radio frequency manager is operatively coupled to the at least one base station, in conjunction with the at least one mobile station. The RF manager is further for managing a handoff upon the occurrence of a prescribed event, the handoff including a handoff-to-self via a simultaneous base station radio and mobile station frequency transition.

24 Claims, 2 Drawing Sheets

METHOD AND APPARATUS FOR SIMULTANEOUS RADIO AND MOBILE FREQUENCY TRANSITION VIA "HANDOFF TO SELF"

This application relates to co-pending U.S. patent application Ser. No. 09/148,378, filed on Sep. 4, 1998, entitled "System and Method of Integrating Dynamic Frequency Association With Channel Borrowing Techniques," naming Daniel Thomas Carter, Michael John McCarthy, Shalini Periyal James Eric Wilson, as inventor. This application also relates to co-pending U.S. patent application Ser. No. 09/301,537, filed on Apr. 28, 1999, entitled "Cellular Network Having Improved Method For Managing RF Channels," Donald V. Hanley, as inventor. The co-pending applications are incorporated herein by reference in their entirety, and are assigned to the assignee of the present invention.

BACKGROUND

1. Field of the Invention

The present invention relates generally to cellular communication networks, and more particularly, to a method and apparatus for simultaneous radio and mobile frequency transitions in wireless communications systems.

2. Discussion of the Related Art

Currently, cellular radio frequency (RF) plans generally assign radio channels, or frequencies, to cells within an RF network based on forecasts and ongoing studies of traffic patterns. Unfortunately, this scheme, referred to as Fixed Channel Allocation (FCA) does not take into account the dynamic nature of traffic in certain portions of a coverage area. For example, in a high-density business corridor, the channel requirements in a subcell A during a given time period may be higher than the capacity of subcell A, resulting in a condition referred to as call blockage. At the same time, a neighboring subcell B may have idle channels due to less-than-capacity call rates.

Another problem with FCA is that cell sites are shrinking is size as demand for capacity increases. Due to both irregularities in propagation and traffic distribution in these small cells, pre-assignment of channels becomes difficult.

With prior known techniques, implementation of a centralized intelligence to monitor channel usage in various cells and assigning channels based on need has not been practical, due to the large amount of overhead processing and messaging necessary to keep both the centralized intelligence and the individual cells apprized of channel usage.

A scheme, known in the art as adaptive channel allocation (ACA), deals with dynamic channel assignment (DCA). ACA includes the ability to dynamically allocate the entire spectrum based on need, without any frequency scanning per cell.

Other relevant channel assignment schemes include hybrid channel assignment (HCA) and borrowing channel assignment (BCA). With HCA, a combination of FCA and DCA, a portion of the total frequency channels uses FCA and the remainder use DCA. With BCA, when all the fixed channels of a cell ("acceptor cell") are occupied, then the acceptor cell borrows free channels from a neighboring cell ("donor cell"). In general, BCAs use some form of central control to lock out other cells from using the channel(s) borrowed by the acceptor cell. While BCA is effective under light to moderate traffic conditions, especially when compared to FCA, under heavy traffic, channel borrowing may be high enough to cause channel usage efficiency to drop drastically and increase blocking probability due to channel locking.

Another technique known in the art is referred to as segregation, a self-organizing dynamic channel allocation scheme. Channels are assigned probabilities of being clear based upon successful use of a given channel for a call. When a call arrives at a cell, the determination of which channel to use to service the call is based on the current probabilities of the channels. Carrier sense (using received signal strength measurement) is performed on the selected channel (i.e., the channel with the highest probability) to ensure that it is clear to use. If not, the probability of that channel is decreased and the next channel is tried. If that channel is clear, then the call is assigned to that channel and its probability is increased.

While segregation offers certain advantages over previously-described methods, it too suffers from uncertain deficiencies, including the fact that the time for convergence to optimal allocation is very long. In addition, the determination of carrier sense only at channel request is known to cause extensive delay. If delay is limited to a finite wait time, then performance of the system degrades rapidly.

In one aspect of the method of segregation, as in FCA, each cell is assigned its nominal channels, if any, from the available frequency spectrum, with a fixed radio assigned to each of the frequencies, respectively. Additionally, each cell may be equipped with one or more radios designated as "DFA radios." In operation, idle DFA radios scan channels that may be borrowed in order to build a probability matrix. This enables the cell to determine which channels to use for traffic prior to actual channel request by a mobile. This reduces the search delay experienced in classic segregation schemes.

The algorithm for implementing the DFA technique operates as follows. During low traffic periods, FCA channels and DFA radios are assigned. Next, a scan list is determined to identify the channels that can potentially be used by a DFA radio in a subcell during its traffic peaks. The identified channels are placed in a scan list. Next, each individual cell uses its DFA radio(s) and Mobile Assisted Channel Allocation (IS-136 MACA) to cyclically scan each channel that may be borrowed to obtain reverse and forward RF information to determine whether the channel is clear. This functionality, referred to as "Scanning Mode", is performed while fixed radios, and possibly other DFA radios, serve ordered traffic.

Probabilities of being clear are then assigned to channels, with weight given to consecutive clear scans. A scan is determined to be clear if the RF signal strength of the channel does not exceed a predefined threshold, which is determined by the network in question. The channels are arranged in an updated, ordered "clear list."

Before an overload condition occurs in which an acceptor cell exhausts all its available channels to service calls, that cell will attempt to borrow channels designated in the ordered clear list, using the DFA radios that were used to construct the ordered clear list. Only those channels whose probability is higher than a predefined minimum threshold may be selected for use. A DFA radio of the acceptor cell is then associated with, or tuned to, the selected channel, at which point the DFA radio is said to be in "Selection Mode." Received signal strength on the channel is continuously monitored to ensure that it is below a predefined threshold. Because of the behavior of the DFA radio during the low traffic periods, the delay in performing this step is substantially decreased, expediting call service at the highest traffic periods.

New calls or handoffs may now be serviced by both fixed radios, as well as DFA radios that are in Selection Mode. If interference is detected on the borrowed channel, the DFA radio is returned to the Scanning Mode. However, if the DFA radio is still needed to service calls, it determines another channel that is free of interference and returns to the Selection Mode. The donor cell (i.e., the cell from which a channel is borrowed) detects the usage of one of its nominal channels by an acceptor cell if close enough, and uses that channel only as a last resort. This eliminates the central control problem of channel locking by allowing that channel to be used if necessary in the donor cell. Lastly, if the cell exits the overload condition, the DFA radio is returned to the Scanning Mode, whereupon the probabilities of being clear for all the frequencies in the scan list are updated.

In another aspect of mobile telecommunication systems, current automatic frequency planning (AFP) transition solutions require calls to be removed from the radio that is changing channels. This requires a complex procedure of gradually changing frequencies without dropping calls and while trying to minimize interference problems due to the transitional frequency plan. The only other solution has been to drop all calls and transition the radios all at once. Other shortcomings are mentioned below.

When implementing a new frequency plan for a telecommunications system, many radios may need to change channels. It is possible for all calls within a given cell to be affected by the channel change. For instance, an interference problem may be created as a result of such transition schemes.

Typical intra-cell handoff is a process of common knowledge in the field of mobile radio telecommunications. Briefly, the normal intra-cell handoff process involves first identifying a new radio/timeslot to accept the call. The new radio is then set to transit SAT or DVCC and the mobile is instructed to change channel to the new radio's channel. The mobile changes to the new channel and the call continues on the new radio and channel. During the known intra-cell handoff process, the central office or mobile switching center (MSC) switches the call trunk connections from the old radio to the new radio.

A common occurrence in adaptive channel allocation (ACA) is for a noisy call to be handed off of a noisy DFA channel onto a clear one. This requires an available radio or time slot to accept the handoff. Accordingly, additional time slots are needed.

Another problem with prior types of handoff is that the handoffs are visible to the central system control. As a result, trunking connections as controlled by the central system control may need to be changed.

It would thus be desirable to provide an improved mobile telecommunications system for facilitating handoffs including simultaneous radio and mobile frequency transitions to overcome the problems in the art.

SUMMARY

A cellular network having an radio frequency (RF) management capability includes a mobile switching center, at least one base station controller operative coupled to the mobile switching center, and at least one base station operatively coupled to the at least one base station controller. The at least one base station is for being operatively coupled with at least one mobile station for carrying out at least one it) mobile communications call. Lastly, a radio frequency manager is operatively coupled to the at least one base station, in conjunction with the at least one mobile station. The RF manager is further for managing a handoff upon the occurrence of a prescribed event, the handoff including a handoff-to-self via a simultaneous base station radio and mobile station frequency transition.

A technical advantage achieved with the embodiments of the present disclosure is that, in an improved mobile telecommunications system, handoff-to-self facilitates simultaneous radio and mobile frequency transitions for overcoming problems in the art.

DETAILED DESCRIPTION

Figure 1:
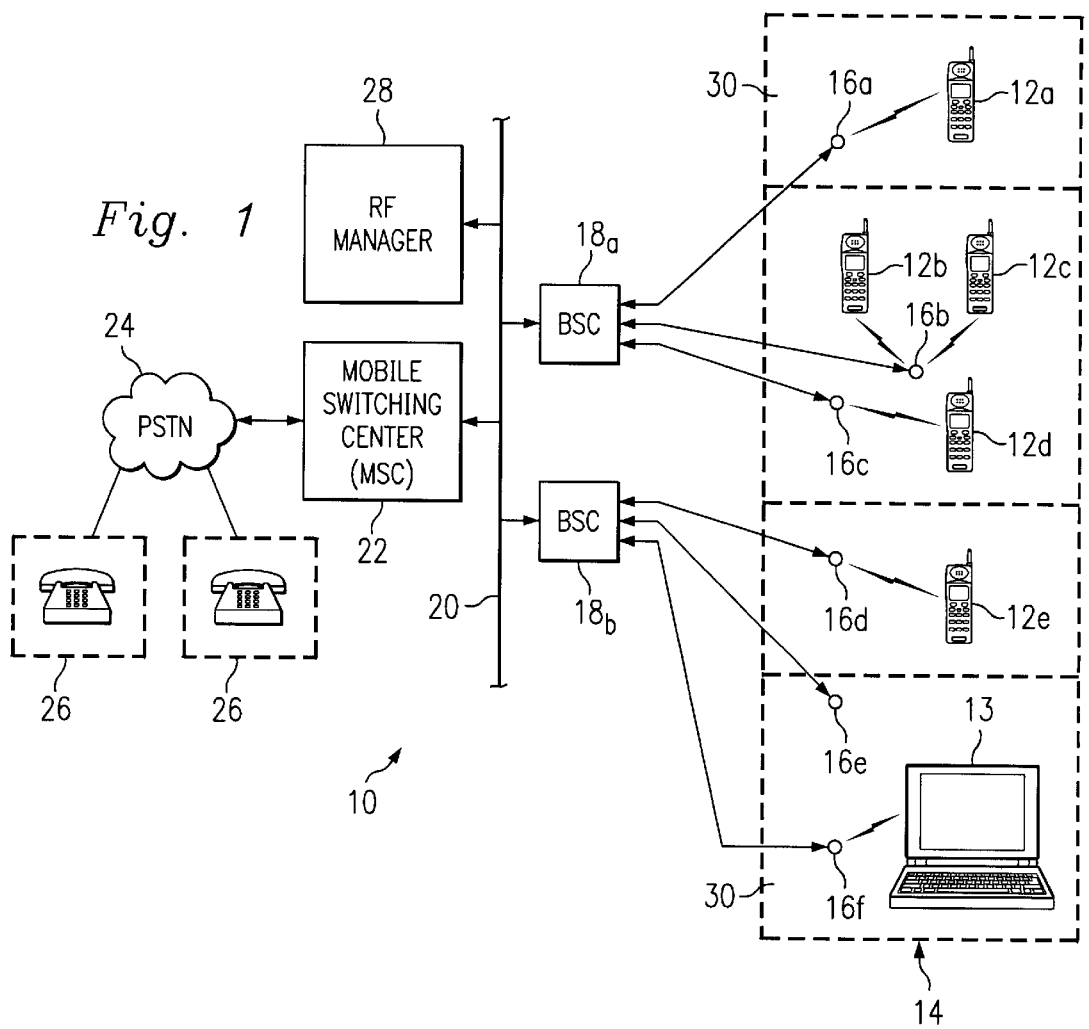
FIG. 1 is a block diagram view of a mobile telecommunication system or cellular network for implementing handoff-to-self according to the embodiments of the present disclosure.

Referring to FIG. 1, a mobile telecommunications system is shown and generally designated by reference numeral 10. A plurality of mobile telephone units (or mobiles) 12 (12a, 12b, 12c, 12d, 12e) are shown having a radio frequency (RF) communications link 14 with one of a number of base transceiver stations (BTS) 16 (16a, 16b, 16c, 16d, 16e). Of course, other types of mobile telecommunications systems, such as a mobile computer 13, may also interface with the network through an RF link to one of the BTS stations 16f. It should be understood that FIG. 1 shows only one example of a mobile telecommunications system architecture and many others are contemplated for use with the present embodiments.

Base transceiver stations (BTSs) 16 are coupled to base station controllers (BSC) 18 via a suitable data link, such as a land link, microwave link, satellite link, or other suitable link. BSCs 18 control the operation of their corresponding BTS stations. A suitable network interface, network connection, or bus 20 couples BSCs 18 with a mobile switching center (MSC) 22 that has overall responsibility for switching the various calls between mobile units 10, as well as between mobile units 10 and the public switched telephone network (PSTN) 24 and telephone or user terminal equipment 26.

An RF manager 28 is shown connected via network interface 20 and has visibility to all of the activity between mobile units 12 and BTSs 16. Accordingly, RF manager 28 is able to monitor the quality of the communications between the mobile units and base station transceivers. Further, RF manager 28 can adjust various parameters of the RF links by sending prescribed control signals to mobile units 12 and BTSs 16 via BSCs 18. RF manager 28 may include any suitable RF manager, for example, such as disclosed in co-pending patent application Ser. No. 09/301, 537, entitled "Cellular Network Having Improved Method for Managing RF Channels." In one embodiment, RF manager 28 may include a computer or other suitable workstation for providing computing resources needed for the RF manager to perform the various functionalities discussed herein.

Network 10 is characterized by a cellular structure including a plurality of cells 30, each cell providing a prescribed coverage area for the cellular system. Each cell includes at least one BTS that provides RF communications links with the various mobile units in the corresponding area. For example, a single cell may have a number of BTSs 16, including at least one fixed frequency radio 16b and at least one dynamic frequency association (DFA) radio 16c according to a particular mobile telecommunication system architecture.

In the mobile telecommunication system 10 of FIG. 1, a mobile unit 12 may be in use in an automobile traversing a path through the cellular network. The user may be placing, receiving or conducting a call to another mobile user or a land based user connected to PSTN 24.

During movement of the mobile unit within a single cell or from a first cell to a second cell, different BTS stations 16 may have responsibility for providing the RF communications to the mobile unit 12 in the automobile. The mobile unit transmission may encounter interference which could be introduced into the communication link, as known in the art. For instance, RF signal quality can decrease, in part, due to the physical distance between the mobile unit and BTS, as well as other environmental factors such as the weather, buildings and other structures.

Interference may also affect the quality of a communications link via the channel, or frequency, which is being used for the signal transmission. For example, a first cell may be assigned one set of frequencies to be used to communicate with the mobile units in that area. An adjacent cell may be assigned another set of frequencies. However, some of the frequencies in the adjacent cells may be overlapping, or at least close enough, to cause one signal on a first channel of the first cell to bleed over to another channel of the second cell, thereby introducing interference into the communication link and decreasing transmission quality. One method to combat interference is to switch (or handoff) the affected transmission links to another channel or frequency according to the embodiments of the present disclosure.

The present embodiments provide a method and apparatus for performing the handoff of a call (or calls) to a different channel without need for another available radio (i.e., BTS). In one embodiment, this can be accomplished by simultaneously handing-off all mobiles on a particular radio to a desired channel. After communicating a handoff command to all mobiles on the particular radio, the radio then tunes to the new channel and accepts back the same mobiles, but on the new channel.

The present embodiments relate to a method of handoff between a mobile and base station simultaneously. In addition, the embodiments relate to the area of operational efficiency, that is, network design for better radio frequency (RF) efficiency. Furthermore, the embodiments provide an improvement for air interface layers 1 and 2 of an advanced mobile phone system (AMPS) and time division multiple access (TDMA) system.

The present embodiments are particularly useful for RF-management features of a Mobile Switching Center (MSC) such as, adaptive channel allocation(ACA), noise-based handoffs, automatic frequency planning (AFP), dynamic frequency association (DFA), etc. As discussed further herein below, there are several uses for the embodiments of the present disclosure.

Figure 2:
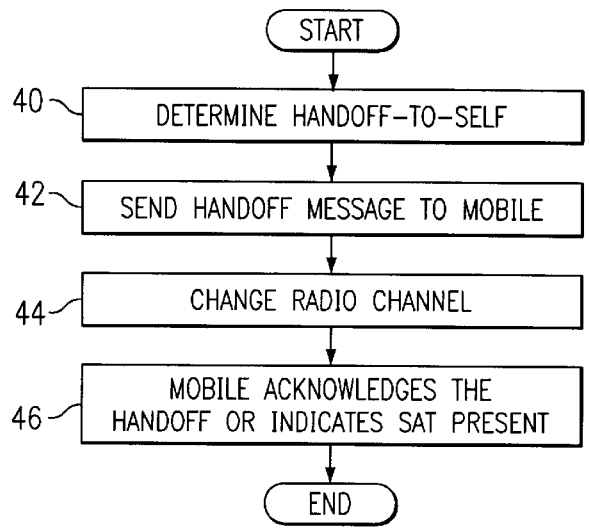
FIG. 2 is a flowchart view of the method according to the present embodiments for performing a handoff-to-self.

FIG. 2 is a flowchart view of the method according to one embodiment for performing a handoff-to-self. In a first step 40, the RF manager determines a need for a given radio to perform a handoff-to-self with its respective mobile unit or units. In a second step 42, the RF manager initiates a handoff message to the given mobile unit(s) of the affected radio. In a next step 44, the RF manager instructs the radio to change radio channels, i.e., from a first channel to a second or new channel. Lastly, in step 46, the mobile unit(s) of the radio acknowledge the handoff-to-self and/or indicate supervisory audio tone (SAT) present.

In other words, proximate in time with the determination that a handoff-to-self is needed, the RF manager also determines a target frequency. The handoff message identifies and provides the new channel for the mobile to handoff to. After transmission of the handoff message to the mobile unit(s), the radio changes its channel to enable the mobile unit(s) to lock onto the new channel. Upon the mobile unit(s) locking onto the new channel of the radio, the mobile unit(s) acknowledges the handoff or provides an SAT present message, whereby the handoff (i.e., handoff-to-self) is complete.

Figure 3:
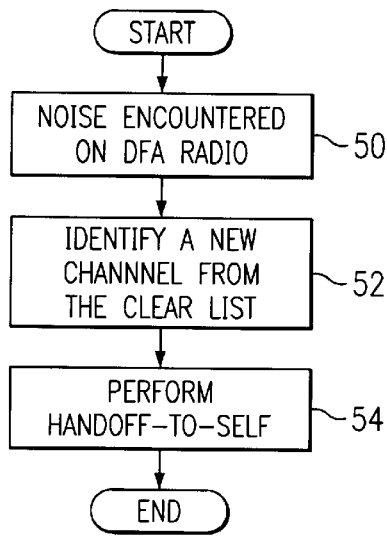
FIG. 3 is a flowchart view of the method according to the present disclosure for handling channel change in an DFA channel using the handoff-to-self method of FIG. 2.

FIG. 3 is a flowchart view of the method according to the present disclosure for handling channel change in a DFA channel using the handoff-to-self method discussed with reference to FIG. 2. In a first step 50, the RF manager determines the presence of noise encountered on a given DFA radio. In a second step 52, in response to the determination of the presence of noise encountered on the DFA radio, the RF manager identifies a new channel from a clear channel list. In a next step 54, the RF manager instructs the DFA radio for performing a handoff-to-self as discussed herein above with reference to FIG. 2.

In conjunction with the illustration of FIG. 3, once it is determined that significant noise is being encountered on a DFA channel, a new channel is identified from the clear channel list. If a switchable channel is found, the handoff-to-self is performed as discussed above.

A common occurrence in adaptive channel allocation (ACA) is for a noisy call to be handed off of a noisy dynamic frequency association (DFA) channel onto a clear channel. With prior systems, the handoff of the DFA channel to a clear channel has required an available radio or time slot to accept the handoff. With the embodiments of the present disclosure, a noisy DFA call (or calls) can be instructed to handoff, that is, handoff-to-self without requiring any other available radio or time slot to accept the handoff.

In response to the handoff-to-self command, the DFA radio switches to a new channel (one that is determined to be a clear channel) and then accepts the same call (or calls) back. In this manner, the method of using a handoff-to-self eliminates the need for the additional time slots and furthermore adds a valuable feature to a mobile telecommunications system ACA algorithm. The mobile telecommunications system ACA algorithm may include an suitable algorithm, for example, such as that disclosed of co-pending patent application Ser. No. 09/148,378, entitled "System and Method of Integrating Dynamic Frequency Association With Channel Borrowing Techniques."

From a high level view, according to one embodiment of the present disclosure, an ACA/DFA noise event can be handled according to the following:

1) A DFA call being handled by a DFA radio encounters severe noise, i.e., noise determined to be above a prescribed threshold. In response to encountering the severe noise and the detection thereof, the RF manager triggers an interference handoff (i.e., a handoff-to-self).

2) The DFA algorithm identifies a new clear channel. In response to identifying the new clear channel, the RF manager instructs the corresponding DFA radio to change to the new channel.

3) The DFA radio then issues handoff commands (i.e., handoff-to-self commands) to all mobiles on that given radio.

4) The DFA radio immediately tunes to the new channel number and starts transmitting a digital verification caller code (DVCC) or supervisory audio tone (SAT). In an alternate embodiment, the DFA radio waits for handoff acknowledgment from the mobiles before executing the channel change on the radio.

5) The mobiles then complete the handoff to the new channel, while remaining on the same physical radio.

Figure 4:
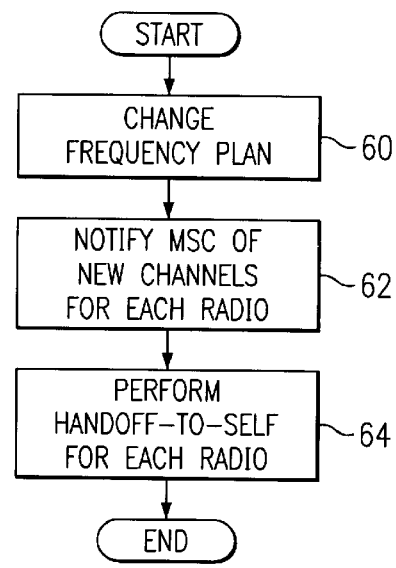
FIG. 4 is a flowchart view of the method according to the present disclosure for changing a frequency plan for a given radio according to the handoff-to-self method of FIG. 2.
Figure 5:
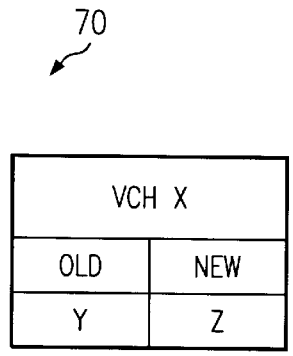
FIG. 5 is a chart view of an illustrative frequency plan change for implementation on the radios of a given cell.

FIG. 4 is a flowchart view of the method according to the present disclosure for changing a frequency plan for a given radio according to the handoff-to-self method discussed with reference to FIG. 2. FIG. 5 is a chart view of an illustrative frequency plan change for implementation on the radios of a given cell.

With reference to FIG. 4, in a first step 60, the RF manager initiates a change frequency plan for a prescribed radio or radios of a prescribed cell. In a second step 62, the RF manager notifies the MSC of the new channels for each radio. In a next step 64, the RF manager instructs the prescribed radio or radios for performing a handoff-to-self as discussed herein above with reference to FIG. 2, further in accordance with the particular change in frequency plan.

In conjunction with the illustration of FIG. 4, once it is determined that the frequency plan is to be changed, the new frequency plan is communicated to the MSC. The MSC (via the RF manager) then determines which radios need to alter their respective channel. With this embodiment, not all radios necessarily change channels and perform a handoff-to-self, however, those radios that do execute the handoff-to-self, do so as discussed with reference to the method of FIG. 2.

Referring now to FIG. 5, a chart view of an illustrative frequency plan change for implementation on the radios of a given cell shall be further discussed. Each radio is characterized by a given voice channel, the voice channel (VCH) X information including an old voice channel (VCH) frequency Y and a new voice channel frequency Z.

As shown in FIG. 5, for example, the frequency plan 70 includes prescribed changes in channels for the radios of a desired cell. For example, the channel plan 70 includes voice channels VCH 0 through VCH 4. The old channel for VCH 0 is one (1) and the new channel is five (5). The old channel for VCH 1 is twenty-five (25) and the new channel is thirty (30). The old channel for VCH 2 is fifty (50) and the new channel is fifty-five (55). The old channel for VCH 3 is seventy-five (75) and the new channel is eighty (80). The old channel for VCH 4 is one hundred (100) and the new channel is one hundred five (105).

Accordingly, when implementing a new frequency plan for a telecommunications system, many radios may need to change channels. The method of the present disclosure prevents any substantial adverse impacts, that might otherwise occur without the present embodiments, which could emanate from a channel change in connection with the implementation of the new frequency plan. The method of the present disclosure furthermore enables all radios of a given cell to change channels simultaneously, accordingly alleviating current interference problems associated with other transition schemes.

An added benefit to the type of handoff of the present disclosure is that it is largely transparent to the central system control since no trunking connections need to be changed. Trunking connections of the central system control are well known in the art, and thus not further described herein.

From a high level view, according to an embodiment of the present disclosure, an AFP frequency transition would occur as follows:

1) A new frequency plan would be determined using an AFP tool, or other suitable method well known in the art.

2) All radios involved would be instructed to change to a corresponding new channel number according to the new frequency plan.

3) The affected radios then issue handoff commands to all mobiles on a respective radio for performing a handoff-to-self.

4) The radio immediately tunes to the new channel number and starts transmitting digital verification caller code (DVCC) or supervisory audio tone (SAT). In an alternate embodiment, the radio waits for handoff acknowledgment from the mobiles before tuning to the new channel number.

5) The affected mobiles complete the handoff to the new channel, while at the same time remaining on the same physical radio.

The present embodiments accordingly provide a workable solution for automatically transitioning system-wide frequency plans without any significant disruption to subscriber calls. The present embodiments also provide an added feature to an ACA algorithm of a particular telecommunications system.

The present embodiments furthermore advantageously provide a method to transition radio and mobiles to a new frequency without requiring the availability of another idle radio to accept the handoffs. The present embodiments further provide quick and clean handoff transitions, while requiring a substantially lesser amount of system resources than previously required by other handoff methods. Accordingly, the present embodiments do not unduly encumber the mobile communication system resources.

The present embodiments accordingly provide an improvement upon the typical AMPS/TDMA intra-cell handoff process. The handoff-to-self method of the present disclosure offers advantages over the prior known intra-cell handoff methods. One advantage is that with the present method, there does not need to be another radio (i.e., a second radio) with a free timeslot to accept the handoff. Another advantage is that the central office and peripherals do not need to switch connections for the given call during a handoff-to-self. Still further, the central office and peripherals may not even need to know about the handoff-to-self. Accordingly, the system resources are advantageously maintained available for potential usage by other requirements of the mobile communications system.

As discussed herein, the present embodiments effectively provide a solution to the problems associated with automatic frequency planning (AFP) and an AFP frequency plan transition. AFP tools automatically create frequency plans for cellular telecommunication systems. Trying to implement a new frequency plan on an existing system has always been complicated and lengthy. Radios would have to be systematically taken offline, changed to a new channel, and then put back in service. There were also problems with interference and capacity until the entire transition was completed.

Using TDMA handoff-to-self greatly simplifies the frequency transition process of automatic frequency planning.

That is, using the TDMA handoff-to-self of the present disclosure, the entire mobile telecommunications system can now transition to the new channels simultaneously. Previously occurring interference issues are now substantially eliminated with the use of the method and system apparatus of the present disclosure.

Implementation of automatic frequency plan transition may now be accomplished for the cellular telecommunications system in a matter of seconds, in comparison to the time required on the order of hours for implementing a frequency plan transition with prior known methods. With the present method, all calls remain on the same physical radio that they were on, while having been moved to a new channel pursuant to handoff-to-self.

Also as discussed herein, the present embodiments can also effectively provide a solution to the problems associated with dynamic frequency association (DFA) noise handoffs. Dynamic frequency association refers to an adaptive channel allocation (ACA) technique as described in co-pending patent application Ser. No. 09/148,378, entitled "System and Method of Integrating Dynamic Frequency Association With Channel Borrowing Techniques." DFA radios have a higher likelihood of encountering interference and requiring a noise-based handoff. The very nature of a DFA radio allows its channel to be changed dynamically. Accordingly, a noise based handoff becomes a simple procedure of selecting a new channel for the DFA radio and executing a handoff-to-self according to the embodiments of the present disclosure.

The usage of the handoff-to-self of the present disclosure in conjunction with DFA noise handoffs, can be especially important in a small cell, such as a micro-cell. A micro-cell is characterized by a small number of radios, for example, having as few as one or two VCHs (voice channels). Accordingly, the likelihood of having an available timeslot on another radio to handle a noise-handoff within the cell is much less. The handoff-to-self of the present disclosure removes the requirement for another radio with an empty timeslot. The handoff-to-self furthers allows for a radio with interference to change from a first channel to a second channel immediately, without having to wait for the existing calls on the radio to finish prior to changing from the first channel to the second channel.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A cellular network having a radio frequency (RF) management capability, said network comprising:
   a mobile switching center;
   at least one base station controller operatively coupled to said mobile switching center;
   at least one base station operatively coupled to said at least one base station controller, the at least one base station for being operatively coupled with at least one mobile station for carrying out at least one mobile communications call in a first cell; and
   a radio frequency manager operatively coupled to said at least one base station and in conjunction with the at least one mobile station for managing a handoff upon the occurrence of a prescribed event, the handoff including a handoff to self operable to transition said mobile station and said base station from a first frequency to a second frequency while remaining operatively coupled, wherein the second frequency is selected without querying a second cell for frequency information.

2. The network of claim 1, wherein the frequency transition includes an automatic frequency plan transition.

3. The network of claim 2, wherein said radio frequency manager further includes:
   means for determining a new frequency plan;
   means for instructing prescribed base station radios of a given cell to change to a new channel number;
   means for issuing handoff commands from the prescribed base station radios to all mobile stations on a respective radio;
   means for tuning the prescribed base station radio to the new channel number; and
   means for completing the handoff by the respective mobile stations to the new channel number while remaining operatively coupled to a same physical radio.

4. The network of claim 3, wherein said means for tuning the prescribed base station radio to the new channel number further includes means for transmitting at least one of the following selected from the group consisting of digital verification caller code (DVCC) and supervisory audio tone (SAT).

5. The network of claim 1, wherein the frequency transition includes an adaptive channel allocation/dynamic frequency association (ACA/DFA) noise event frequency transition.

6. The network of claim 5, wherein said radio frequency manager further includes:
   means for detecting a prescribed level of severe noise during a DFA call and triggering an interference handoff in response thereto;
   means for identifying a new clear channel using a prescribed DFA algorithm and instructing a prescribed base station radio to change to the new clear channel;
   means for issuing handoff commands from the prescribed base station radio to all mobile stations on the radio;
   means for tuning the prescribed base station radio to the new channel number; and
   means for completing the handoff by the respective mobile stations to the new channel number while remaining operatively coupled to a same physical radio.

7. The network of claim 6, wherein means for tuning the prescribed base station radio to the new channel number further includes means for transmitting at least one of the following selected from the group consisting of digital verification caller code (DVCC) and supervisory audio tone (SAT).

8. The network of claim 1, wherein the frequency transition includes one of the following selected from the group consisting of an automatic frequency plan transition and an adaptive channel allocation/dynamic frequency association (ACA/DFA) noise event frequency transition.

9. The network of claim 8, wherein said radio frequency manager further includes:
   means for determining a new frequency plan and, in response thereto, instructing prescribed base station radios of a given cell to change to a new channel number;
   means for detecting a prescribed level of severe noise during a DFA call and triggering an interference handoff in response thereto, further including means for identifying a new clear channel using a prescribed DFA algorithm and, in response thereto, instructing a prescribed base station radio to change to the new clear channel;

means for issuing handoff commands from the prescribed base station radios to all mobile stations on a respective radio; and means for tuning the prescribed base station radio to the new channel number; and means for completing the handoff by the respective mobile stations to the new channel number while remaining operatively coupled to a same physical radio.

10. The network of claim 9, wherein means for tuning the prescribed base station radio to the new channel number further includes means for transmitting at least one of the following selected from the group consisting of digital verification caller code (DVCC) and supervisory audio tone (SAT).

11. A method of radio frequency (RF) management in a cellular network, said method comprising:

providing a mobile switching center;

providing at least one base station controller operatively coupled to the mobile switching center;

providing at least one base station operatively coupled to the at least one base station controller, the at least one base station for being operatively coupled with at least one mobile station via a first channel for carrying out at least one mobile communications call;

providing a radio frequency manager operatively coupled to the at least one base station and in conjunction with the at least one mobile station; and managing a handoff upon the occurrence of a prescribed event, the handoff including using a handoff-to-self to switch directly from the first channel to a second channel via a simultaneous base station radio and mobile station frequency transition, wherein said mobile station remains operatively coupled via the second channel to said base station during and after the handoff to self.

12. The method of claim 11, wherein the frequency transition includes an automatic frequency plan transition.

13. The method of claim 12, wherein providing the radio frequency manager further includes:

determining a new frequency plan;

instructing prescribed base station radios of a given cell to change to a new channel number;

issuing handoff commands from the prescribed base station radios to all mobile stations on a respective radio;

tuning the prescribed base station radio to the new channel number; and completing the handoff by the respective mobile stations to the new channel number while remaining operatively coupled to a same physical radio.

14. The method of claim 13, wherein tuning the prescribed base station radio to the new channel number further includes beginning the transmission of at least one of the following selected from the group consisting of digital verification caller code (DVCC) and supervisory audio tone (SAT).

15. The method of claim 11, wherein the frequency transition includes an adaptive channel allocation/dynamic frequency association (ACA/DFA) noise event frequency transition.

16. The method of claim 15, wherein providing the radio frequency manager further includes:

detecting a prescribed level of severe noise during a DFA call and triggering an interference handoff in response thereto;

identifying a new clear channel using a prescribed DFA algorithm and instructing a prescribed base station radio to change to the new clear channel;

issuing handoff commands from the prescribed base station radio to all mobile stations on the radio;

tuning the prescribed base station radio to the new channel number; and completing the handoff by the respective mobile stations to the new channel number while remaining operatively coupled to a same physical radio.

17. The method of claim 16, wherein tuning the prescribed base station radio to the new channel number further includes beginning the transmission of at least one of the following selected from the group consisting of digital verification caller code (DVCC) and supervisory audio tone (SAT).

18. The method of claim 11, wherein the frequency transition includes one of the following selected from the group consisting of an automatic frequency plan transition and an adaptive channel allocation/dynamic frequency association (ACA/DFA) noise event frequency transition.

19. The method of claim 18, wherein providing the radio frequency manager further includes:

determining a new frequency plan and, in response thereto, instructing prescribed base station radios of a given cell to change to a new channel number;

detecting a prescribed level of severe noise during a DFA call and triggering an interference handoff in response thereto, further including identifying a new clear channel using a prescribed DFA algorithm and, in response thereto, instructing a prescribed base station radio to change to the new clear channel;

issuing handoff commands from the prescribed base station radios to all mobile stations on a respective radio;

tuning the prescribed base station radio to the new channel number; and completing the handoff by the respective mobile stations to the new channel number while remaining operatively coupled to a same physical radio.

20. The method of claim 19, wherein tuning the prescribed base station radio to the new channel number further includes beginning the transmission of at least one of the following selected from the group consisting of digital verification caller code (DVCC) and supervisory audio tone (SAT).

21. A method for radio frequency transition using a handoff to self in a telecommunications network, said method comprising:

establishing a call between a base station and a mobile station using a first communications channel at a first frequency;

identifying a prescribed event signaling that the call should be transitioned from the first frequency to a second frequency; and establishing a second communications channel at the second frequency by simultaneously transitioning the base station and the mobile station to the second frequency, wherein the base station and the mobile station remain operatively coupled during the transition, the transition enabling the base station to handoff the call from the first frequency to the second frequency without using another base station.

22. The method of claim 21 further including utilizing a frequency plan to determine the second frequency.

23. The method of claim 21 wherein the prescribed event is the detection of a predetermined level of noise on the first communications channel.

24. The method of claim 21 further including determining whether a level of noise of the second communications channel is below a predetermined threshold.

* * * * *